US012626866B2

(12) United States Patent
Hong et al.

(10) Patent No.: US 12,626,866 B2
(45) Date of Patent: May 12, 2026

(54) METHOD OF MANUFACTURING A MULTILAYER CERAMIC CAPACITOR

(71) Applicant: SAMSUNG ELECTRO-MECHANICS CO., LTD., Suwon-si (KR)

(72) Inventors: Hyuk Jin Hong, Suwon-si (KR); Young Hoon Song, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 131 days.

(21) Appl. No.: 18/383,567

(22) Filed: Oct. 25, 2023

(65) Prior Publication Data

US 2024/0177935 A1     May 30, 2024

(30) Foreign Application Priority Data

Nov. 29, 2022     (KR) ........................ 10-2022-0162354

(51) Int. Cl.
| | |
|---|---|
| *H01G 7/00* | (2006.01) |
| *H01G 4/005* | (2006.01) |
| *H01G 4/12* | (2006.01) |
| *H01G 4/224* | (2006.01) |
| *H01G 4/30* | (2006.01) |

(52) U.S. Cl.
CPC .............. *H01G 4/30* (2013.01); *H01G 4/005* (2013.01); *H01G 4/1227* (2013.01); *H01G 4/224* (2013.01)

(58) Field of Classification Search
CPC .......... H01G 4/005; H01G 4/012; H01G 4/12; H01G 4/1218; H01G 4/1227; H01G 4/224; H01G 4/30
See application file for complete search history.

(56) References Cited

U.S. PATENT DOCUMENTS

| | | | | |
|---|---|---|---|---|
| 6,080,468 | A * | 6/2000 | Yamaguchi | ........... H01F 41/046 |
| | | | | 428/701 |
| 7,056,443 | B2 * | 6/2006 | Sasaki | ................... C04B 35/493 |
| | | | | 29/25.35 |
| 2015/0348712 | A1 | 12/2015 | Lee et al. | |
| 2018/0301281 | A1 | 10/2018 | Park et al. | |

(Continued)

FOREIGN PATENT DOCUMENTS

| | | |
|---|---|---|
| JP | 2005-039068 A | 2/2005 |
| JP | 2019-204931 A | 11/2019 |
| KR | 10-1952871 B1 | 2/2019 |

OTHER PUBLICATIONS

Partial European Search Report issued Apr. 30, 2024 for European Patent Application No. 23203994.1.

(Continued)

*Primary Examiner* — Paul D Kim

(74) *Attorney, Agent, or Firm* — Morgan Lewis & Bockius LLP

(57) ABSTRACT

A method of manufacturing a multilayer ceramic capacitor including printing a titanium oxide-based material on a region between a plurality of internal electrode patterns of one surface of each of a plurality of ceramic green sheets on which the plurality of internal electrode patterns are respectively disposed; and cutting the region between the plurality of internal electrode patterns in a first direction in a structure in which the plurality of ceramic green sheets are stacked in the first direction.

5 Claims, 11 Drawing Sheets

(56) References Cited

U.S. PATENT DOCUMENTS

| | | | |
|---|---|---|---|
| 2019/0035554 A1 | 1/2019 | Inomata et al. | |
| 2019/0362897 A1 | 11/2019 | Kato | |
| 2021/0012968 A1 | 1/2021 | Taniguchi | |
| 2022/0139620 A1* | 5/2022 | Lee .......................... | H01G 4/12 |
| | | | 361/301.4 |

OTHER PUBLICATIONS

Extended European Search Report dated Nov. 18, 2024, issued in corresponding European Patent Application No. 23203994.1.

* cited by examiner

II–II'

Margin END                    ZONE 1

ZONE 2                        ZONE 3

ZONE 4

ZONE 5

INTERNAL ELECTRODE

METHOD OF MANUFACTURING A MULTILAYER CERAMIC CAPACITOR

CROSS-REFERENCE TO RELATED APPLICATION(S)

This application claims benefit of priority to Korean Patent Application No. 10-2022-0162354 filed on Nov. 29, 2022 in the Korean Intellectual Property Office, the disclosure of which is incorporated herein by reference in its entirety.

TECHNICAL FIELD

The present disclosure relates to a multilayer ceramic capacitor and a method for manufacturing the multilayer ceramic capacitor.

A multilayer ceramic capacitor may be widely used as an electronic device component such as a computer, a PDA, a mobile phone, or the like due to its small size, high capacitance, and easy mounting, and may be also widely used as an electrical device (including a vehicle) component due to its high reliability and high strength.

When a multilayer ceramic capacitor is used in an electronic device, the multilayer ceramic capacitor may be miniaturized, and large capacitance of the multilayer ceramic capacitor, relative to its volume, may become more important. Importance for improving strength or reducing a crack generation rate in a multilayer ceramic capacitor having an advantageous structure for forming large capacitance relative to its volume may increase.

When a multilayer ceramic capacitor is used in an electrical device, the multilayer ceramic capacitor may be exposed to harsh environments (e.g., possibilities of high voltage, high temperature, external impact, and the like), and improving strength or reducing a crack generation rate may become important for securing reliability in the harsh environments.

SUMMARY

An aspect of the present disclosure is to provide a multilayer ceramic capacitor and a method for manufacturing the multilayer ceramic capacitor, efficiently improving strength or reducing a crack generation rate.

According to an aspect of the present disclosure, a multilayer ceramic capacitor includes a body including a capacitance region in which at least one first internal electrode and at least one second internal electrode are alternately stacked in a first direction with at least one dielectric layer interposed therebetween; and first and second external electrodes disposed on the body to be spaced apart from each other with the capacitance region interposed therebetween in a second direction, different from the first direction, and respectively connected to the at least one first internal electrode and the at least one second internal electrode, wherein the body further includes a plurality of margin regions disposed with the capacitance region interposed therebetween in a third direction, different from the first and second directions, wherein each of the plurality of margin regions includes a second margin region and a first margin region disposed between the second margin region and the capacitance region, and wherein a size of a crystal grain in the second margin region is larger than a size of a crystal grain in the first margin region.

According to another aspect of the present disclosure, a method for manufacturing a multilayer ceramic capacitor, includes printing a titanium oxide-based material on a region between a plurality of internal electrode patterns of one surface of each of a plurality of ceramic green sheets on which the plurality of internal electrode patterns are respectively disposed; and cutting the region between the plurality of internal electrode patterns in a first direction in a structure in which the plurality of ceramic green sheets are stacked in the first direction.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
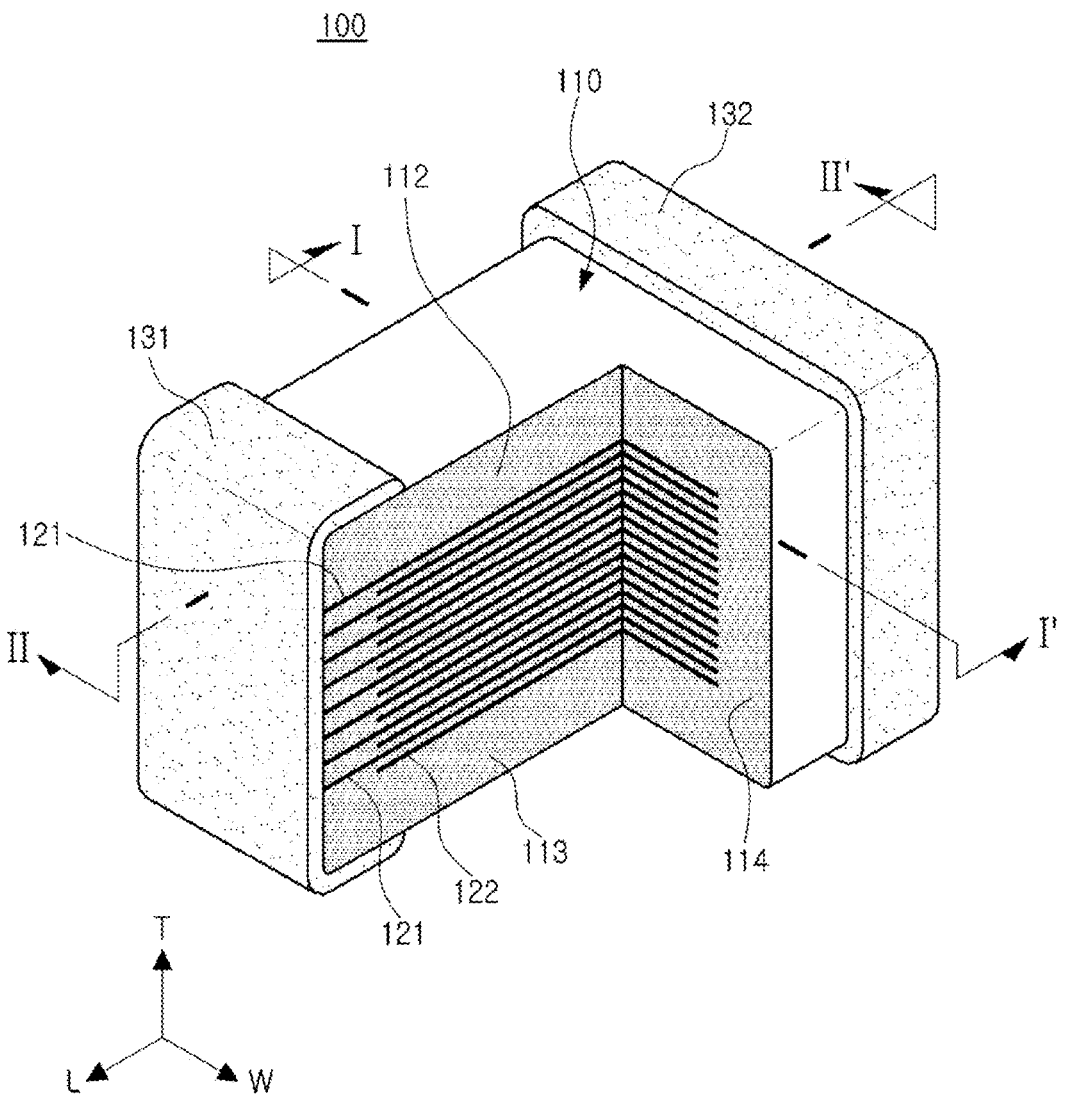
FIG. 1 is a perspective view illustrating a multilayer ceramic capacitor according to an embodiment of the present disclosure.

Embodiments of the present disclosure may be modified in many different forms, and the scope of the present disclosure is not limited to embodiments described below. In addition, embodiments of the present disclosure may be provided to more completely explain the present disclosure to those skilled in the art. Therefore, shapes and sizes of elements in the drawings may be exaggerated for clearer description, and elements indicated by the same reference numeral are the same elements in the drawings.

In addition, irrelevant descriptions will be omitted to clearly describe the present disclosure, and to clearly express a plurality of layers and regions, thicknesses may be magnified. The same elements having the same function within the scope of the same concept will be described with use of the same reference numerals.

Throughout the specification, when a component is referred to as "include," "comprise," or "comprising," it means that it may further include other components as well, rather than excluding other components, unless specifically stated otherwise.

If a direction of a hexahedron is defined in order to clearly describe embodiments of the present disclosure, L, W, and T indicated on the drawings represent a longitudinal direction, a width direction, and a thickness direction, respectively. In this case, the thickness direction may be used as the same concept as a stacking direction (or a first direction) in which dielectric layers are stacked.

Figure 2A:
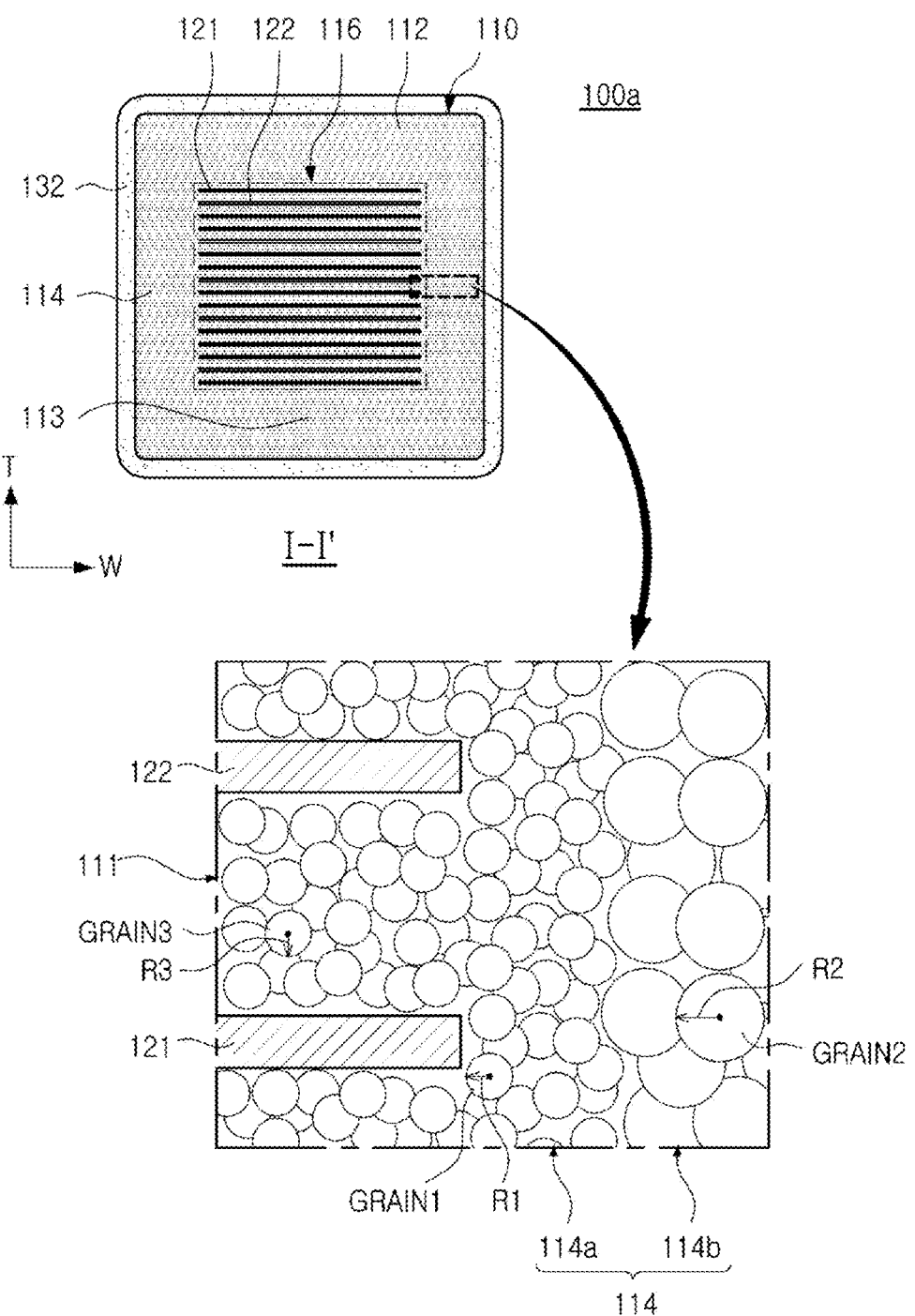
FIGS. 2A and 2B are cross-sectional views illustrating a difference in size of a crystal grain in the margin region of FIG. 1, taken along line I-I'.
Figure 3A:
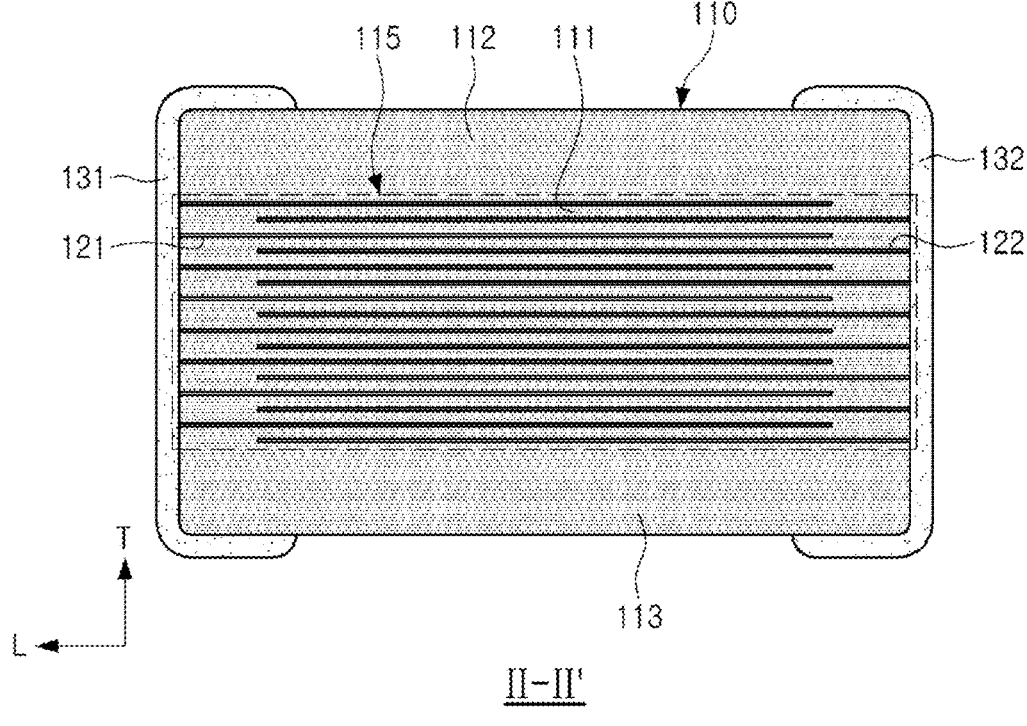
FIG. 3A is a cross-sectional view of FIG. 1, taken along line II-II'.

Referring to FIGS. 1, 2A, and 3A, a multilayer ceramic capacitor (100 and 100a) according to an embodiment of the present disclosure may include a body 110, a first external electrode 131, and a second external electrode 132.

The body 110 may include a capacitance region 116 in which at least one first internal electrode 121 and at least one second internal electrode 122 are alternately formed in a first direction (e.g., the T direction) with at least one dielectric layer 111 interposed therebetween.

For example, the body 110 may be formed as a ceramic body by sintering the capacitive region 116. In this case, the at least one dielectric layer 111 disposed in the body 110 may be in a sintered state, and adjacent dielectric layers may be integrated with each other, such that a boundary therebetween is not readily apparent without using a scanning electron microscope (SEM).

For example, the body 110 may be formed as a hexahedron having both side surfaces in the longitudinal direction L, both side surfaces in the width direction W, and both side surfaces in the thickness direction T, and a vertex and/or a corner thereof may be rounded as it is polished. A shape and a size of the body 110, and the number of stacked dielectric layers 111 are not limited to those illustrated in the present embodiment.

A thickness of the at least one dielectric layer 111 may be arbitrarily changed according to a capacitance design of the multilayer ceramic capacitor (100 and 100a), and the at least one dielectric layer 111 may include a ceramic powder having a high permittivity, for example, a barium titanate ($BaTiO_3$)-based powder. And, the present disclosure is not limited thereto. In addition, various ceramic additives (e.g., MgO, $Al_2O_3$, $SiO_2$, ZnO), organic solvents, plasticizers, binders, dispersants, or the like may be added to the ceramic powder according to required specifications of the multilayer ceramic capacitor (100 and 100a).

An average particle diameter of the ceramic powder used to form the at least one dielectric layer 111 may not be particularly limited, and the required specifications of the multilayer ceramic capacitor (100 and 100a) (e.g., miniaturization and/or high capacitance may be required, such as capacitors for electronic devices, high withstand voltage characteristics and/or high strength may be required, such as a capacitor for electric devices, or the like), but may be adjusted to have, for example, 400 nm or less.

For example, the at least one dielectric layer 111 may be formed by applying and drying a slurry containing a powder particle such as barium titanate ($BaTiO_3$) or the like on a carrier film to prepare a plurality of ceramic sheets. The ceramic sheet may be formed by mixing a ceramic powder, a binder, and a solvent to prepare a slurry, and forming the slurry into a sheet having a thickness of several μm by a doctor blade method, but the present disclosure is not limited thereto.

The at least one first internal electrode 121 and the at least one second internal electrode 122 may be formed by printing a conductive paste containing a conductive metal to extend a length of the body 110 along the stacking direction (e.g., the T direction) of the dielectric layer, to be alternately exposed from one side surface and the other side surface in the direction L, and may be electrically insulated from each other by the dielectric layer interposed therebetween.

For example, each of the at least one first internal electrode 121 and the at least one second internal electrode 122 may have an average particle size of 0.1 to 0.2 μm, and may be formed by a conductive paste for internal electrodes containing 40 to 50% by weight of conductive metal powder, but the present disclosure is not limited thereto. The conductive paste may be nickel (Ni), copper (Cu), palladium (Pd), silver (Ag), lead (Pb), platinum (Pt), or the like alone, or an alloy thereof, but the present disclosure is not limited thereto.

For example, an internal electrode pattern may be formed by applying a conductive paste for internal electrodes on the ceramic sheet by a printing method or the like. As the printing method of the conductive paste, a screen printing method, a gravure printing method, an inkjet printing method, and the like may be used, but the present disclosure is not limited thereto. For example, the body 110 may be manufactured by stacking, pressing, and sintering the ceramic sheet on which the internal electrode pattern is printed, as two hundreds (200) to three hundreds (300) ceramic sheets.

Capacitance of the multilayer ceramic capacitor (100 and 100a) may be proportional to an overlapping area between the at least one first internal electrode 121 and the at least one second internal electrode 122 in the stacking direction (e.g., the T direction), may be proportional to the total number of the at least one first internal electrodes 121 and at least one second internal electrode 122, to be stacked, and may be inversely proportional to a distance between the at least one first internal electrode 121 and the at least one second internal electrode 122. The distance between the internal electrodes may be substantially the same as a thickness of each of the at least one dielectric layer 111.

The multilayer ceramic capacitor (100 and 100a) may have greater capacitance relative to a thickness thereof, as the distance between the at least one first internal electrode 121 and the at least one second internal electrode 122 is shorter. A withstand voltage of the multilayer ceramic capacitor (100 and 100a) may be higher, as the distance between the internal electrodes is longer. Therefore, the distance between the internal electrodes may be adjusted according to the required specifications of the multilayer ceramic capacitor (100 and 100a) (e.g., miniaturization and/or high capacitance may be required, such as capacitors for electronic high devices, withstand voltage characteristics and/or high strength may be required, such as a capacitor for electric devices, or the like). A thickness of each of the at least one first internal electrode 121 and the at least one second internal electrode 122 may also be affected by the distance between the internal electrodes.

For example, when high withstand voltage characteristics and/or high strength are required in the multilayer ceramic capacitor (100 and 100a), the distance between at least one first internal electrode 121 and at least one second internal electrode 122 may be designed to exceed twice the thickness of each. For example, when miniaturization and/or high capacity are required in the multilayer ceramic capacitor (100 and 100*a*), each of the at least one first internal electrode 121 and the at least one second internal electrode 122 may be designed to have a thickness of 0.4 µm or less, and the total number of layers to be stacked may be designed to be four hundreds (400) or more.

The first and second external electrodes 131 and 132 may be spaced apart from each other with the capacitance region 116 interposed therebetween in a second direction (e.g., the L direction), different from the first direction (e.g., the T direction), and may be connected to the at least one first internal electrode 121 and the at least one second internal electrode 122, respectively.

For example, each of the first and second external electrodes 131 and 132 may be formed from a paste containing a metal component by a method of dipping, a method of printing a conductive paste, a sheet transfer method, a pad transfer method, a sputter plating method, an electrolytic plating method, or the like. For example, the first and second external electrodes 131 and 132 may include a sintered layer formed by sintering the paste, and a plating layer formed on an outer surface of the sintered layer, and may further include a conductive resin layer formed between the sintered layer and the plating layer. For example, the conductive resin layer may be formed by containing a conductive particle in a thermosetting resin such as epoxy. The metal component may be copper (Cu), nickel (Ni), palladium (Pd), platinum (Pt), gold (Au), silver (Ag), lead (Pb), tin (Sn), or the like alone, or an alloy thereof, but the present disclosure is not limited thereto.

The multilayer ceramic capacitor (100 and 100*a*) may be mounted on or embedded in an external substrate (e.g., a printed circuit board), and may be connected to at least one of a wiring, a land, a solder, or a bump, to be electrically connected to a circuit (e.g., an integrated circuit, a processor) electrically connected to the external substrate.

Referring to FIGS. 1, 2A and 3A, the body 110 may include at least one of a plurality of cover layers 112 and 113 or a plurality of margin regions 114. A core region 115 may include the capacitance region 116 and the plurality of margin regions 114.

The plurality of cover layers 112 and 113 may be disposed with the capacitance region interposed therebetween in the first direction (e.g., the T direction). Each of the plurality of cover layers 112 and 113 may be thicker than each of the at least one dielectric layer 111, and may provide upper and lower surfaces of the body 110. Portions of each of the first and second external electrodes 131 and 132 may be disposed on the lower and/or upper surfaces of the body 110.

The plurality of cover layers 112 and 113 may prevent an external environmental factor (e.g., moisture, a plating solution, or a foreign substance) from penetrating into the capacitance region, may protect the body 110 from an external impact, and may also improve flexural strength. For example, the plurality of cover layers 112 and 113 may include the same material as or a different material (e.g., a thermosetting resin such as epoxy resin) from the at least one dielectric layer 111.

The plurality of margin regions 114 may be arranged with the capacitance region interposed therebetween in a third direction (e.g., the W direction), different from the first and second directions (e.g., T and L directions). The plurality of margin regions 114 may prevent the at least one first internal electrode 121 and the at least one second internal electrode 122 from being exposed from a surface of the body 110 in the third direction (e.g., the W direction). Therefore, it is possible to prevent an external environmental factor (e.g., moisture, a plating solution, or a foreign substance) from penetrating into the at least one first internal electrode 121 and the at least one second internal electrode 122 through the surface in the third direction. In addition, reliability and lifespan of the multilayer ceramic capacitor (100 and 100*a*) may be improved. In addition, since the at least one first internal electrode 121 and the at least one second internal electrode 122 may be formed by efficiently extending in the third direction due to the plurality of margin regions 114, the plurality of margin regions 114 may increase an overlapping area between the at least one first internal electrode 121 and the at least one second internal electrode 122, to improve capacitance of the multilayer ceramic capacitor (100 and 100*a*).

Figure 2B:
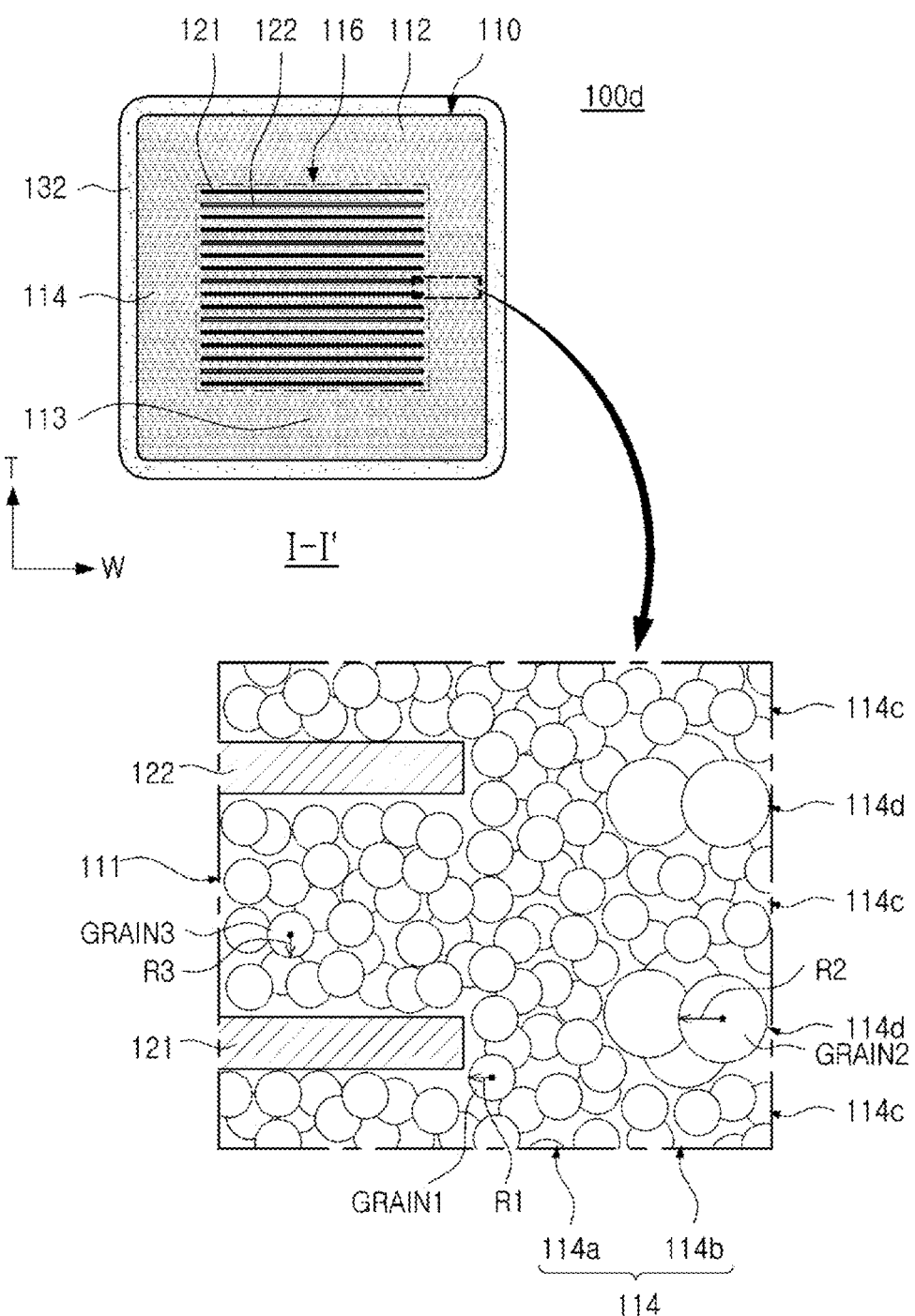

Referring to FIGS. 2A and 2B, a plurality of margin regions 114 of a multilayer ceramic capacitor (100*a* and 100*d*) according to an embodiment may include a second margin region 114*b*, and a first margin region 114*a* disposed between the second margin region 114*b* and a capacitance region 116, respectively. A size of a crystal grain GRAIN2 of the second margin region 114*b* (corresponding to a radius R2) may be greater than a size of a crystal grain GRAIN1 of the first margin region 114*a* (corresponding to a radius R1).

The second margin region 114*b* having the large crystal grain GRAIN2 may have greater strength against an impact from an outside of a body 110. Since a difference in grain size between the first and second margin regions 114*a* and 114*b* may further improve a density between the first and second margin regions 114*a* and 114*b*, overall strength of the plurality of margin regions 114 may be efficiently improved.

In addition, since capacitance versus a unit size of the multilayer ceramic capacitor (100*a* and 100*d*) may increase as permittivity of at least one dielectric layer 111 increases, the at least one dielectric layer 111 may include a ferroelectric such as barium titanate (BaTio$_3$). Since the ferroelectric such as barium titanate (BaTiO$_3$) may also have piezoelectricity, internal stress may be formed due to a reverse piezoelectric (or an electric distortion) phenomenon as a voltage is applied to the multilayer ceramic capacitor (100*a* and 100*d*). According to a difference in grain size between the first and second margin regions 114*a* and 114*b*, the plurality of margin regions 114 may effectively reduce the internal stress. Therefore, since possibility of occurring cracks in the body 110 may be reduced, and the body 110 may reduce electrical bottleneck points (e.g., air gaps, unstable internal electrode boundaries, or the like), withstand voltage may increase.

For example, the radius R2 of the crystal grain GRAIN2 of the second margin region 114*b* may be twice or more than the radius R1 of the crystal grain GRAIN1 of the first margin region 114*a*. For example, the radius R2 may be greater than or equal to 500 µm, and the radius R1 may be less than 250 µm.

Figure 8:
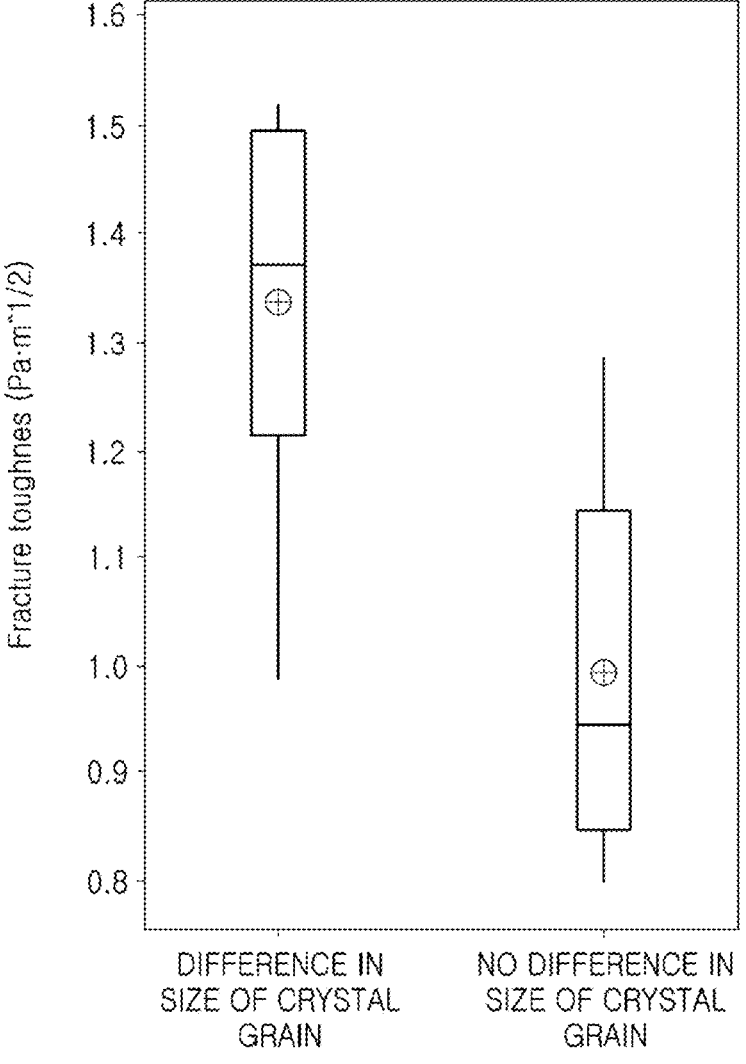
FIG. 8 is a graph illustrating a difference in fracture toughness of a margin region, according to a difference in size of crystal grains in first and second margin regions of a multilayer ceramic capacitor according to an embodiment of the present disclosure.

Referring to FIG. 8, when there is a difference in grain size between first and second margin regions 114*a* and 114*b* (e.g., R2 is 2 to 3 times that of R1), fracture toughness of a plurality of margin regions 114 may be about 1.33 PA·m$^{1/2}$, and, when there is no difference in grain size between the first and second margin regions 114*a* and 114*b* (e.g., R2 is 2 to 3 times that of R1), the fracture toughness of the plurality of margin regions 114 may be about 1.0 PA·m$^{1/2}$. The fracture toughness may correspond to strength.

Referring to FIG. 2A, the size of the crystal grain GRAIN2 of the second margin region 114*b* (corresponding to the radius R2) may be greater than a size of a crystal grain GRAIN3 of the at least one dielectric layer 111 (corresponding to a radius R3), and a difference between the size of the crystal grain GRAIN2 of the second margin region 114*b* (corresponding to the radius R2) and the size of the crystal grain GRAIN1 of the first margin region 114*a* (corresponding to the radius R1) may be greater than a difference between the size of the crystal grain GRAIN1 of the first margin region 114*a* (corresponding to the radius R1) and the size of the crystal grain GRAIN3 of the at least one dielectric layer 111 (corresponding to the radius R3). Therefore, due to the difference between the size of the crystal grain GRAIN2 of the second margin region 114*b* (corresponding to the radius R2) and the size of the crystal grain GRAIN1 of the first margin region 114*a* (corresponding to the radius R1), efficiency in reducing possibility of occurring failure due to a reverse piezoelectric (or an electric distortion) phenomenon as a voltage is applied to the multilayer ceramic capacitor (100*a* and 100*d*) may be further increased.

The sizes and the radii R1, R2, and R3 of the crystal grains GRAIN1, GRAIN2, and GRAIN3 may be measured as average values of portions corresponding to R1, R2, and R3, in a WT plane of the multilayer ceramic capacitor formed by polishing the multilayer ceramic capacitor in the L direction. For example, the WT plane may be subjected to analysis using at least one of a transmission electron microscope (TEM), an atomic force microscope (AFM), a scanning electron microscope (SEM), an optical microscope, or a surface profiler, and R1, R2, and R3 may be measured by visual confirmation or image processing (e.g., pixel identification based on color or brightness of pixels, pixel value filtering for efficiency of the pixel identification, distance integration between identified pixels, or the like).

Alternatively, when the number of crystal grains GRAIN1, GRAIN2, and GRAIN3 is too large in the WT plane, since an average value of sizes of a plurality of crystal grains in the second margin region 114*b* overlapping in the third direction (e.g., the W direction) from a center of the body 110 may be greater than an average value of sizes of a plurality of crystal grains in the first margin region 114*a* overlapping in the third direction (e.g., the W direction) from the center of the body 110, only a plurality of crystal grains overlapping a straight line passing through the center in the W direction may be measured.

Figure 7A:
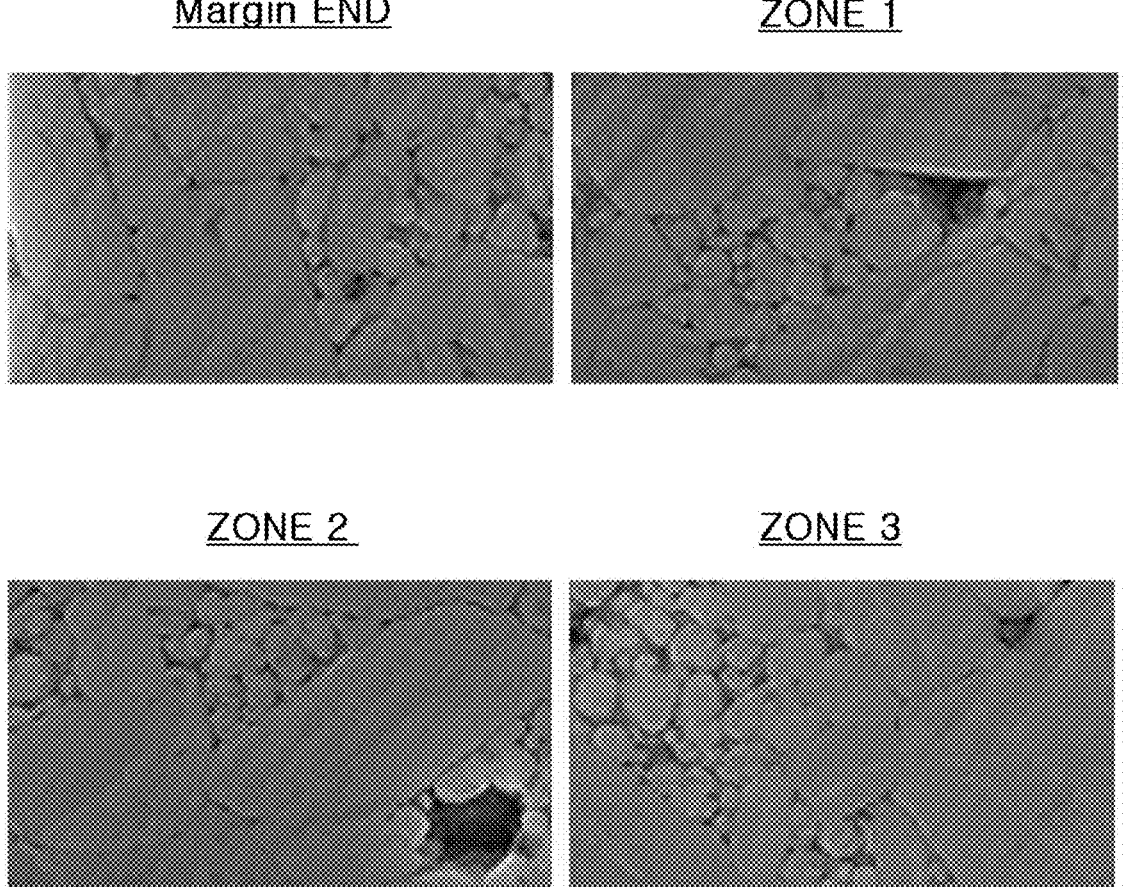
FIG. 7A illustrates photographs of cross-sections of a second margin region in a multilayer ceramic capacitor according to an embodiment of the present disclosure.

Four (4) SEM photographs of FIG. 7A are cross-sectional views of a second margin region sequentially illustrated along a straight line passing from a center of a body in the W direction. The margin end is a portion, closest to a surface of the body, zone 1 is a portion, $2^{nd}$ closest to the surface of the body, zone 2 is a portion, $3^{rd}$ closest to the surface of the body, and zone 3 is a portion, 4th closest to the surface of the body.

Figure 7B:
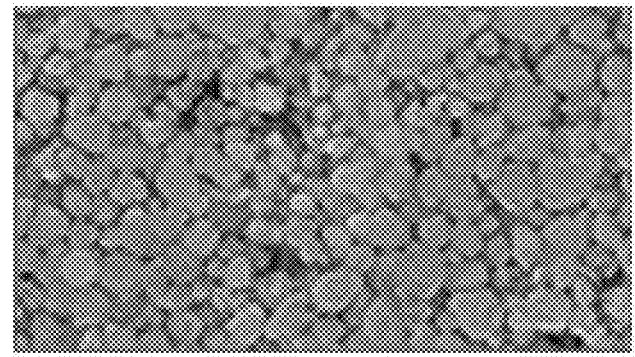
FIG. 7B illustrates photographs of cross-sections of a first margin region and a dielectric layer of a multilayer ceramic capacitor according to an embodiment of the present disclosure.
Figure 7B:
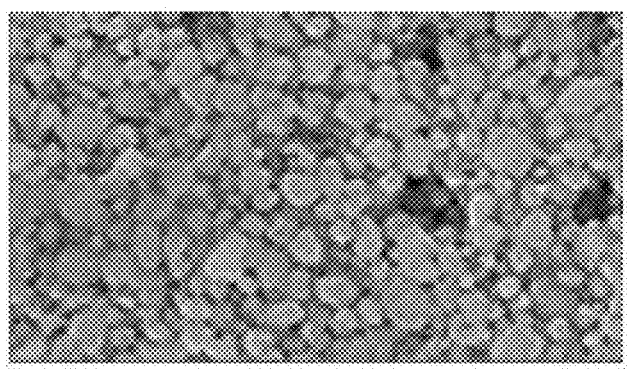
Figure 7B:
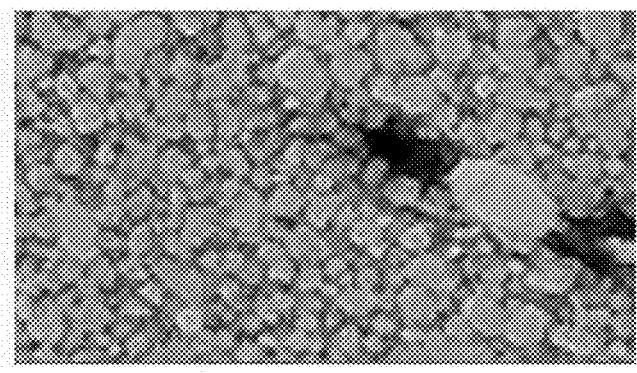

Three (3) SEM photographs of FIG. 7B are cross-sectional views of a first margin region sequentially taken along a straight line passing from a center of a body 110 in the W direction. The internal electrode is a portion, closest to an internal electrode, section 5 zone 4 is a portion, $2^{nd}$ closest to the internal electrode, zone 5 is a portion, $3^{rd}$ closest to the internal electrode.

An overall size of crystal grains of FIG. 7A may be greater than the overall size of crystal grains of FIG. 7B. Since the number of SEM photographs (4) of FIG. 7A is greater than the number of SEM photographs (3) of FIG. 7B, a volume of the second margin region may be larger than a volume of the first margin region, but the present disclosure is not limited thereto.

Figure 4A:
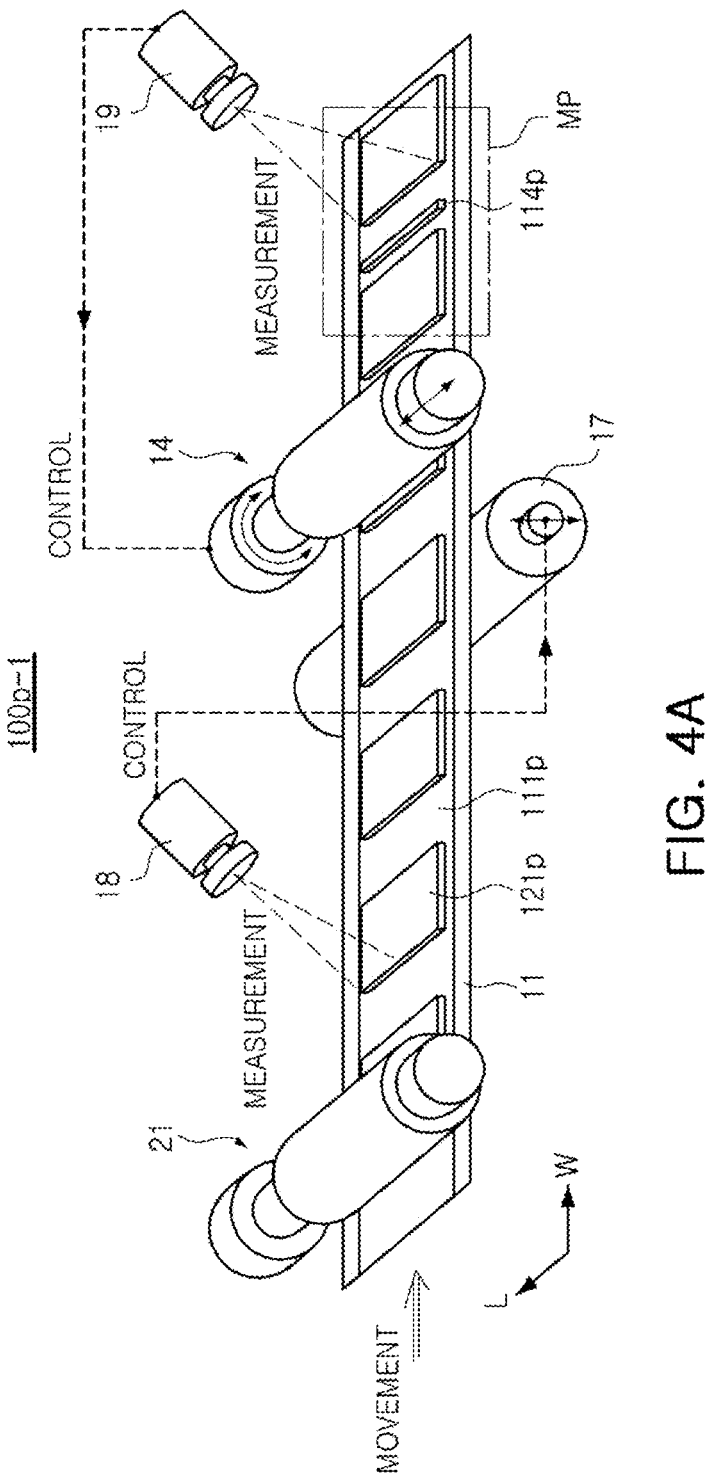
FIG. 4A is a perspective view illustrating a printing operation in a method of manufacturing a multilayer ceramic capacitor according to an embodiment of the present disclosure.
Figure 4B:
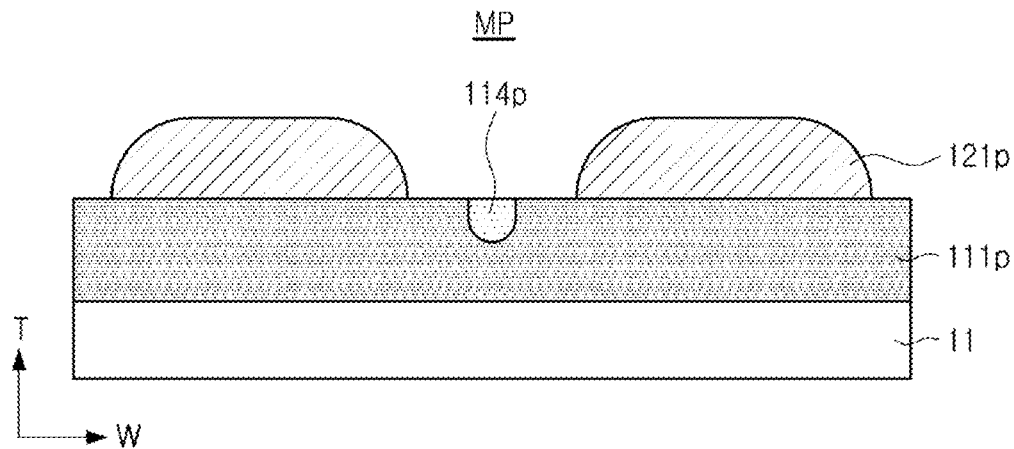
FIG. 4B is an enlarged side view of portion MP of FIG. 4A.

Referring to FIGS. 4A and 4B, a method of manufacturing a multilayer ceramic capacitor according to an embodiment of the present disclosure may include printing a titanium oxide-based material 114*p* a region between a plurality of internal electrode patterns 121*p* of one surface (e.g., an upper surface) of each of a plurality of ceramic green sheets 111*p* on which the plurality of internal electrode patterns 121*p* are respectively disposed (100*p*-1).

The titanium oxide-based material 114*p* may be diffused into an adjacent ceramic green sheet 111*p* by a sintering process, and a crystal grain of the titanium oxide-based material 114*p* may be relatively overgrown. Therefore, a portion on which the titanium oxide-based material 114*p* is printed may correspond to the second margin region 114*b* of FIGS. 2A and 2B, and a portion on which the titanium oxide-based material 114*p* is not printed may correspond to the first margin region 114*a* of FIGS. 2A and 2B. The titanium oxide-based material 114*p* may include titanium oxide ($TiO_2$).

Since a surface (or a direction) of the titanium oxide-based material 114*p* to be printed is equal to a surface (or a direction) of the plurality of internal electrode patterns 121*p* to be printed, it is advantageous to accurately print the titanium oxide-based material 114*p* at a designed position. Therefore, a difference (process dispersion) between a designed structure of the second margin region 114*b* of FIGS. 2A and 2B and an actually formed structure may be reduced, and stability of securing strength of the multilayer ceramic capacitor may be further improved.

Figure 5:
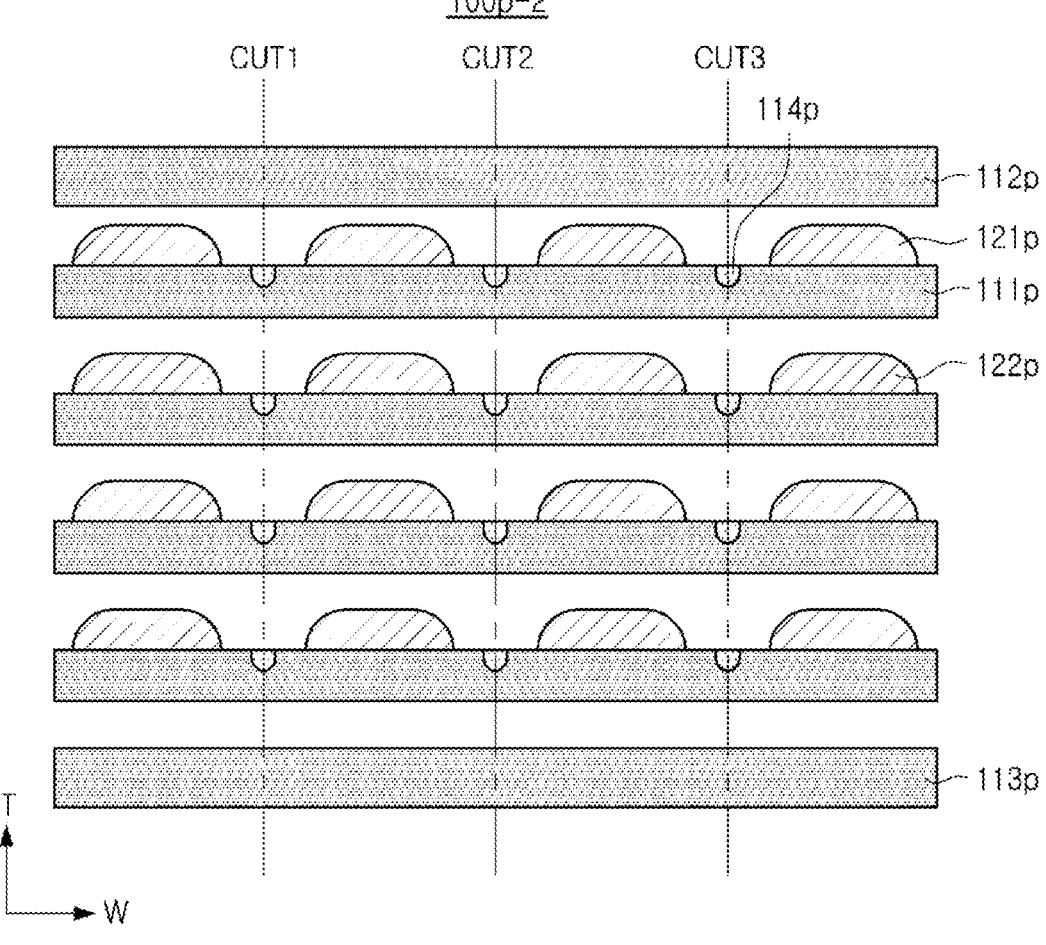
FIG. 5 is a view illustrating a cutting operation in a method of manufacturing a multilayer ceramic capacitor according to an embodiment of the present disclosure.

Referring to FIG. 5, a method of manufacturing a multilayer ceramic capacitor according to an embodiment of the present disclosure may include cutting between a plurality of internal electrode patterns 121*p* and 122*p* in the first direction (e.g., in the T direction) in a structure in which a plurality of ceramic green sheets 111*p* are stacked in the first direction (100*p*-2). Cutting lines CUT1, CUT2, and CUT3 may extend in the first direction (e.g., the T direction).

Since the printing a titanium oxide-based material 114*p* may be performed before cutting the plurality of ceramic green sheets 111*p*, a second margin region of each of a plurality of multilayer ceramic capacitors may be efficiently formed.

Figure 6:
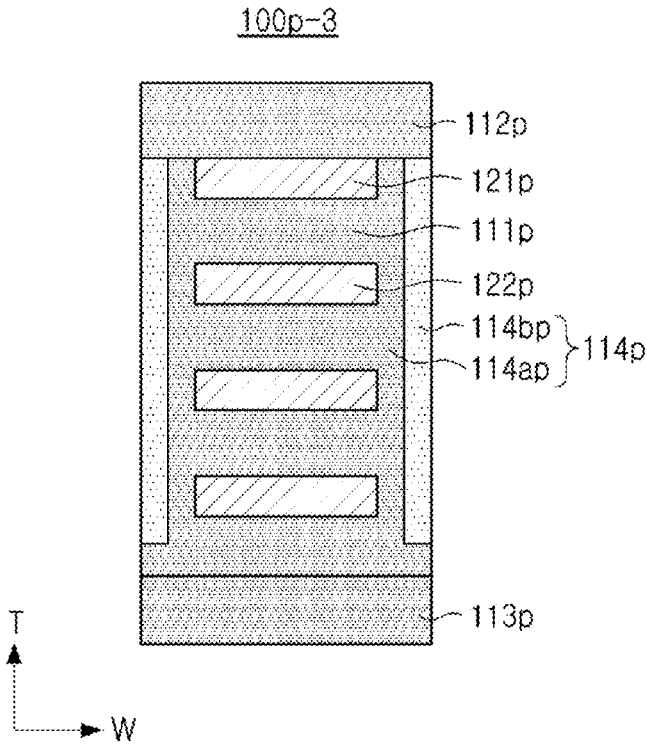
FIG. 6 is a view illustrating a sintering operation in a method of manufacturing a multilayer ceramic capacitor according to an embodiment of the present disclosure.

Referring to FIG. 6, after the cutting (100*p*-2), a method of manufacturing a multilayer ceramic capacitor according to an embodiment of the present disclosure may include sintering a structure in which a plurality of ceramic green sheets 111*p* are stacked in the first direction (e.g., the T direction) (100*p*-3). Therefore, a crystal grain of a portion 114*bp* on which a titanium oxide-based material is printed may be relatively overgrown, compared to a crystal grain of a portion 114*ap* on which a titanium oxide-based material is not printed.

At least a portion of the portion 114*ap* on which the titanium oxide-based material is not printed or the portion 114*bp* on which the titanium oxide-based material is printed may be formed based on portions of the plurality of ceramic green sheets 111*p*. Referring to FIGS. 2A and 2B, each of at least one dielectric layer 111, a first margin region 114*a*, and a second margin region 114*b* may include a ferroelectric. The ferroelectric may be barium titanate, but the present disclosure is not limited thereto.

Referring to FIG. 4A, the printing (100*p*-1) may include printing the plurality of internal electrode patterns 121*p* and the titanium oxide-based material 114*p* using a gravure method. The gravure method may print a metal material on one surface of a ceramic green sheet 111*p* by rotating a ceramic green sheet 111*p* while transporting the ceramic green sheet 111*p* in a horizontal direction, in a state in which the metal material is added to a surface of a rotating roll.

A first roll 21 may print the plurality of internal electrode patterns 121*p* on the one surface of the ceramic green sheet 111p, and a second roll 14 may print titanium oxide-based material 114p on the one surface of the ceramic green sheet 111p.

According to rotation of a transfer roll 17, a transfer plate 11 may be transferred. The ceramic green sheet 111p may be disposed on the transfer plate 11, and may be transferred together with the transfer plate 11.

A first detector 18 may detect a difference between an actual printed position and a designed position of the plurality of internal electrode patterns 121p, and may control a position of the transfer roll 17 based on a detection result.

A second detector 19 may detect a difference between an actual printed position and a designed position of the titanium oxide-based material 114p, and may control the rotation angle of the second roll 14 based on a detection result.

Referring to FIG. 4B, the printing (100p-1) may include printing the titanium oxide-based material 114p such that the titanium oxide-based material 114p is spaced apart from the plurality of internal electrode patterns 121p. A volume (or thickness) relationship between the first and second margin regions 114a and 114b of FIGS. 2A and 2B may be appropriately adjusted by the printing (100p-1).

Referring to FIG. 5, the ceramic green sheets 112p and 113p for forming the cover layer may be further stacked before cutting the plurality of ceramic green sheets 111p, and may be cut together when cutting the plurality of ceramic green sheets 111p. Additional stacking of the ceramic green sheets 112p and 113p for forming the cover layers may be omitted, depending on a design of the plurality of cover layers 112 and 113 of FIGS. 1 to 3B. For example, when the plurality of cover layers 112 and 113 contain a material not based on the ceramic green sheet, such as an epoxy resin, the ceramic green sheets 112p and 113p for forming the cover layer may be omitted.

Referring to FIG. 6, the portion 114ap on which the titanium oxide-based material is not printed and the portion 114bp on which the titanium oxide-based material is printed may overlap the ceramic green sheets 112p and 113p for forming the cover layers in the first direction (e.g., the T direction), respectively. Referring to FIGS. 2A and 2B, the first and second margin regions 114a and 114b may overlap the plurality of cover layers 112 and 113 in the first direction (e.g., the T direction).

Referring to FIG. 5, the cutting lines CUT1, CUT2, and CUT3 may pass through the titanium oxide-based material 114p. Therefore, referring to FIG. 6, the portion 114bp on which the titanium oxide-based material is printed may be exposed externally, and the portion 114ap on which the titanium oxide-based material is not printed may not be exposed externally. Referring to FIGS. 2A and 2B, the first margin region 114a may be embedded in the body 110, and the second margin region 114b may be spaced apart from the at least one first internal electrode 121 and the at least one second internal electrode 122, and may be exposed to the outside of the body 110.

Referring to FIG. 2B, the second margin region 114b of the multilayer ceramic capacitor 100d according to an embodiment may have a structure in which a plurality of third margin regions 114c and a plurality of fourth margin regions 114d are alternately arranged in one direction (e.g., the T direction), and a size of a crystal grain of the plurality of fourth margin regions 114d may be larger than a size of a crystal grain of the plurality of third margin regions 114c.

Referring to FIG. 4B, the printing (100p-1) may include printing the titanium oxide-based material 114p such that at least a portion of the titanium oxide-based material 114p is inserted into each of the plurality of ceramic green sheets 111p. A volume (or thickness) relationship between the third and fourth margin regions 114c and 114d of FIG. 2B may be adjusted by adjusting how deeply the titanium oxide-based material 114p is inserted into the plurality of ceramic green sheets 111p.

Figure 3B:
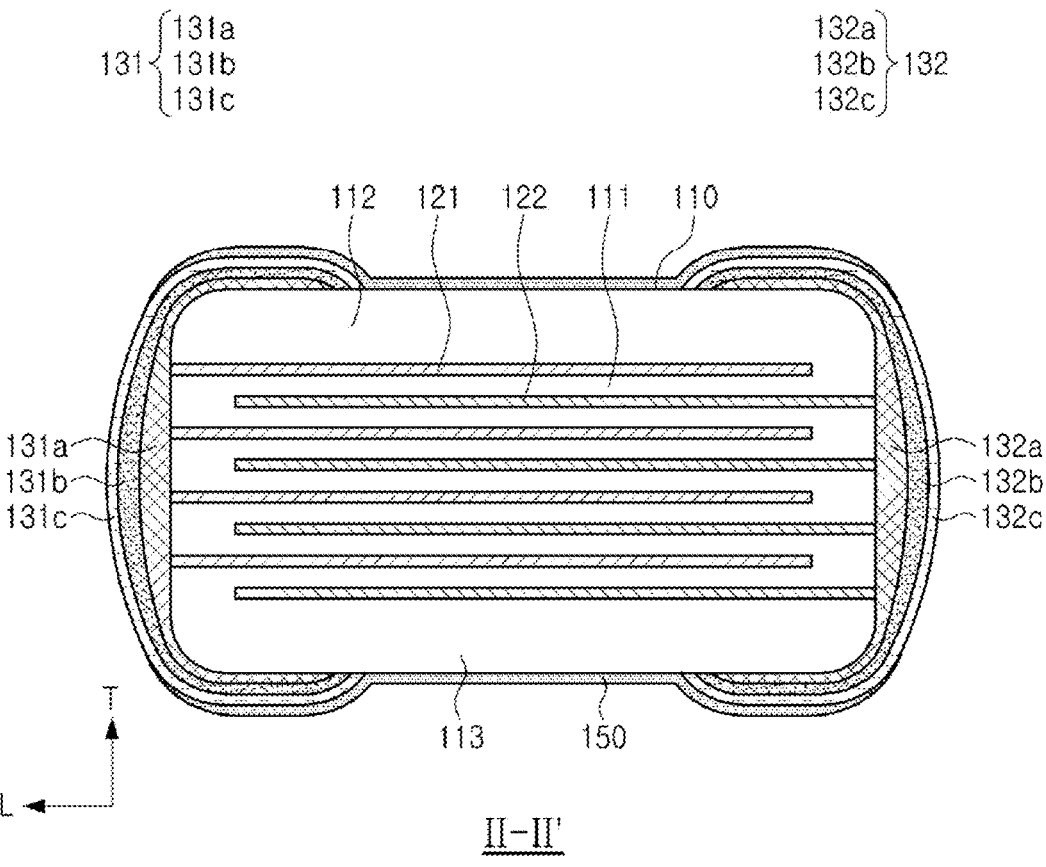
FIG. 3B is a cross-sectional view illustrating an external electrode of a multilayer ceramic capacitor according to an embodiment of the present disclosure.

Referring to FIG. 3B, at least one of the first and second external electrodes 131 and 132 may include conductive resin layers 131b and 132b containing a resin, base electrode layers 131a and 132a disposed between the conductive resin layers 131b and 132b and the body 110 and having higher conductivity than the conductive resin layers 131b and 132b, and plating layers 131c and 132c providing an outer surface of one of the first and second external electrodes 131 and 132. A portion of a surface (e.g., upper and lower surfaces) of the body 110 may be covered by a coating layer 150.

For example, the base electrode layers 131a and 132a may be formed by sintering in a state in which a portion of the body 110 is dipped in a paste containing a metal material and/or a glass frit or the paste is printed on the portion of the body 110, and may be formed by a sheet transfer method or a pad transfer method. The metal material may be copper (Cu) for improving electrical connectivity to the body 110, but the present disclosure is not limited thereto. For example, the metal material may include at least one of copper (Cu), nickel (Ni), palladium (Pd), platinum (Pt), gold (Au), silver (Ag), or lead (Pb), and may be changed depending on a metal material of the internal electrodes in the body 110.

For example, the plating layers 131c and 132c may be formed by sputtering or electroplating, but the present disclosure is not limited thereto. For example, the plating layers 131c and 132c may include an inner plating layer containing nickel (Ni), and an outer plating layer containing tin (Sn).

For example, the conductive resin layers 131b and 132b may include a thermosetting resin such as epoxy and a plurality of conductive particles (e.g., the same metal material as the base electrode layer). The present disclosure is not limited to the thermosetting resin, and the conductive resin layers 131b and 132b may include a bisphenol A resin, a glycol epoxy resin, a novolak epoxy resin, or a resin that may be liquid at room temperature due to its low molecular weight, among derivatives thereof.

The conductive resin layers 131b and 132b may improve durability of the first and second external electrodes 131 and 132 against an external impact, or may prevent penetration of external moisture or a plating solution into the body 110. Therefore, the conductive resin layers 131b and 132b may reduce a speed at which reliability of the first and second external electrodes 131 and 132 deteriorate even when the first and second external electrodes 131 and 132 are exposed to harsh environments.

The coating layer 150 may cover outer surfaces of upper and lower cover layers 112 and 113, and may further cover portions of the first and second external electrodes 131 and 132 and/or outer surfaces of the side margin portions depending on a design. For example, the coating layer 150 may include organic/inorganic compounds containing Si for improving moisture resistance of the body 110, and may include organic/inorganic substances and polymer components containing fluorine (F). For example, the coating layer 150 may be implemented with a silane coupling agent or a silicone-resin to have water repellency.

Although the embodiments of the present disclosure have been described in detail above, the present disclosure is not limited by the above-described embodiments and the accompanying drawings, and is intended to be limited by the appended claims.

Accordingly, various forms of substitution, modification, and alteration may be made by those skilled in the art without departing from the technical spirit of the present disclosure described in the claims, which may be also within the scope of the present disclosure.

According to the present disclosure, it is possible to efficiently obtain higher strength or a reduced crack defect rate of a multilayer ceramic capacitor. Alternatively, possibility that internal stress due to a reverse piezoelectric (or an electric distortion) phenomenon in a multilayer ceramic capacitor leads to failure of the multilayer ceramic capacitor may also be reduced.

While example embodiments have been illustrated and described above, it will be apparent to those skilled in the art that modifications and variations could be made without departing from the scope of the present disclosure as defined by the appended claims.

What is claimed is:

1. A method for manufacturing a multilayer ceramic capacitor, comprising:

printing a titanium oxide-based material on a region between a plurality of internal electrode patterns of one surface of each of a plurality of ceramic green sheets on which the plurality of internal electrode patterns are respectively disposed; and cutting the region between the plurality of internal electrode patterns in a first direction in a structure in which the plurality of ceramic green sheets are stacked in the first direction.

2. The method of claim 1, after the cutting, further comprising sintering the structure in which the plurality of ceramic green sheets are stacked in the first direction.

3. The method of claim 1, wherein the printing comprises printing the plurality of internal electrode patterns and the titanium oxide-based material by a gravure method.

4. The method of claim 1, wherein the printing comprises printing the titanium oxide-based material such that the titanium oxide-based material is spaced apart from the plurality of internal electrode patterns.

5. The method of claim 1, wherein the printing comprises printing the titanium oxide-based material such that at least a portion of the titanium oxide-based material is inserted into each of the plurality of ceramic green sheets.

* * * * *